United States Patent [11] 3,616,202

[72] Inventor Donald Wayne Marble
 Sparks, Nev.
[21] Appl. No. 48,871
[22] Filed June 15, 1970
[45] Patented Oct. 26, 1971
[73] Assignee Research Corporation
 New York, N.Y.
 Continuation of application Ser. No.
 840,047, July 8, 1969, now abandoned.

[54] CULTURE OF ANAPLASMA MARGINALE
 4 Claims, No Drawings
[52] U.S. Cl. ........................................ 195/1.8,
 195/1.3, 424/88, 424/89
[51] Int. Cl. ....................................... C12k 1/06
[50] Field of Search .......................... 195/1.1–1.8

[56] References Cited
 UNITED STATES PATENTS
3,511,908 5/1970 Brock et al. .................. 424/88
 OTHER REFERENCES
 Summers et al. Exptl. Parasit. 16: 57–63 (1965) " Attempts To Transmit Bovine Anaplasmosis To Small Laboratory Animals."
 Love et al. Am. J. Vet. Res 28: 51– 54 (1967) " Effects Of Temperature and Time On the Infectivity of Anaplasma Marginale After Treatment with Protective Additives."

Primary Examiner—Shep K. Rose
Attorney—Stowell & Stowell

ABSTRACT: The organism *Anaplasma marginale* is cultured in rabbit bone marrow tissue culture established in buffered "-Medium 199" containing sheep serum with erythrocyte stimulating factor, fetal calf serum and vitamin B-12.

CULTURE OF ANAPLASMA MARGINALE

This application is a continuation of prior copending application Ser. No. 840,047, filed July 8, 1969 now abandoned.

The present invention relates to a method for culturing *Anaplasma marginale* and to the culture medium employed.

*A. marginale* is the causative organism of anaplasmosis, an infectious noncontagious disease of cattle extensively investigate since first described in 1910. Study of the disease with view to preparing a suitable vaccine is complicated by the fact that, unless frozen, the causative organism loses its infectivity generally within about 4 days. Attempts to culture *A. marginale* in vivo or in vitro heretofore have been unsuccessful.

I have now discovered that *Anaplasma marginale 12.* can be cultured in a rabbit bone marrow tissue culture established in buffered "Medium 199" containing sheep serum with erythrocyte-stimulating factor, fetal calf serum and vitamin B–12. The culture medium may also contain the antibiotics penicillin and streptomycin, and a fungicide such as mycostatin.

More specifically, the present invention is a method for culturing *Anaplasma marginale* which comprises inoculating cells infected with the organism, preferably red blood cells obtained from an animal in acute anaplasmosis, into a rabbit bone marrow tissue culture established in buffered "Medium 199" containing sheep serum with erythrocyte-stimulating factor, fetal calf serum and vitamin B–12. My invention also contemplates the culture medium utilized.

In practicing the present invention, to the standard "Medium 199" according to Morgan et al. Proc. Soc. Exp. Biol. and Med. 73, 1 (1950) there is added sheep serum (preferably about 5 percent by volume) with erythrocyte-stimulating factor, fetal calf serum (about 5 percent by volume) and vitamins B–12 (preferably at the rate of 5 micrograms per ml. of medium). The pH of the medium is adjusted to 7.2–7.6 with sodium bicarbonate buffer and antibiotics such as penicillin and streptomycin, and a fungicide such as mycostatin may be added.

It is essential that the sheep serum utilized contain erythrocyte-stimulating factor. Erythrocyte production in the sheep is stimulated by removing about 300–500 ml. of blood from a 150-sheep for 6 days and blood collected subsequently contains the erythrocyte-stimulating factor. The serum, after separation from the cells, should be checked for bacterial contamination on a blood agar plate, and if contaminated, is best sterilized by filtration through a bacterial filter.

To obtain the bone marrow, the long bones, usually femur and/or humerus, of a freshly killed domestic rabbit are dissected out. (Younger rabbits about 6–8 weeks of age are preferred because their bones contain more active red marrow and less fat). After scraping off extraneous tissue, the bone is rinsed in an aqueous disinfectant solution containing chlorhexidine or a quaternary ammonium salt. The shaft of the bone is grasped with sterile tissue forceps, flamed lightly in a bunsen burner, and the epiphysis and diaphysis cut off with sterile scissors.

The shaft of the bone is flushed of its marrow into a sterile culture bottle using a sterile syringe filled with culture media and adapted with a 1 ½-inch 20-gauge needle. Some jabbing and scraping with the needle is generally necessary to free the red marrow. Mechanical dissociation of the marrow is accomplished by repeated forceful pipetting and rapid shaking of the flask but no attempt is made to grind the marrow or free individual cells. The small clumps of cells which remain appear to have a beneficial effect of the resultant medium.

Final concentration of cells in the medium should be between 1 and 2 percent by volume. Cells from one femur will usually plant about 80 ml. of medium. The marrow and buffered medium is placed in prescription bottles or Leighton tubes and incubated for 72 hours at 37° C. without shaking or moving to establish the culture. The medium is then ready for seeding.

Seeding may be with any cellular material infected with *Anaplasma marginale*. The organism is generally obtained from an animal in acute anaplasmosis by aseptic bleeding from the jugular vein into a sterile vessel containing heparin. The red blood cells are separated from the plasma by centifugation, washed twice with sterile physiological saline and pipetted into the tissue culture medium at a dilution of 1:20 by volume and returned to the 37° C. incubator.

The culture is maintained by weekly passage of 1ml. of infected culture into 20 ml. of newly established (preferably 72 hour) rabbit bone marrow tissue culture medium. *Anaplasma marginale* so cultivated maintained its infectivity even after 140 days (20 passages).

I claim:

1. A method for culturing *Anaplasma marginale* which comprises inoculating cells infected with the organism into a tissue culture medium containing rabbit bone marrow established in buffered "Medium 199" containing sheep serum with erythrocyte-stimulating factor, fetal calf serum and vitamin B-12.

2. A method according to claim 'wherein the cells infected with the organism are red blood cells obtained from an animal in acute anaplasmosis.

3. A method according to claim 1 wherein the culture is maintained by periodic passage of a portion of the injected culture into newly established rabbit bone marrow tissue culture medium.

4. A rabbit bone marrow tissue culture medium, comprising rabbit bone marrow established in a tissue culture medium containing "Medium 199" sheep serum with erythrocyte stimulating factor, fetal calf serum and vitamin B–12

UNITED STATES PATENT OFFICE
CERTIFICATE OF CORRECTION

Patent No. 3,616,202          Dated  October 26, 1971

Inventor(s)  Donald Wayne Marble

It is certified that error appears in the above-identified patent and that said Letters Patent are hereby corrected as shown below:

In the claims:

In Column 2, that portion of line 39 reading "cyte-stimulating" should read ---cyte stimulating---.

In Column 2, that portion of line 40 reading "method according to claim '", should read ---method according to claim 1---.

In Column 2, line 49, a comma (,) should appear after "'Medium 199'".

Signed and sealed this 18th day of April 1972.

(SEAL)
Attest:

EDWARD M. FLETCHER, JR.　　　　　ROBERT GOTTSCHALK
Attesting Officer　　　　　　　　Commissioner of Patents